Patented June 25, 1935

2,006,257

UNITED STATES PATENT OFFICE 2,006,257

SMELTING SCRAP BATTERY PLATES AND THE LIKE

Jesse O. Betterton, Metuchen, N. J., assignor to American Smelting and Refining Company, New York, N. Y., a corporation of New Jersey No Drawing. Application January 12, 1933, Serial No. 651,361. Renewed December 28, 1934

12 Claims. (Cl. 75—15)

This invention relates to the treatment of lead-bearing materials having an appreciable sulphur or sulphur and oxygen content such as scrap battery plates and materials of similar composition. The invention provides an improved process for smelting such materials in a furnace of the reverberatory type and for softening the molten metal in situ.

By the present invention the antimony content of such materials is concentrated in a slag containing a much higher percentage of that element than has heretofore been commercially possible in the reverberatory smelting of scrap battery plates; lead is produced containing only minor quantities of antimony, for example, .025% or less; volatilization losses and the subsequent treatment of fume for the recovery of values are reduced to a minimum; and losses ordinarily occasioned by reason of matte formation are avoided by eliminating the matte in toto.

The invention further consists in the new and novel features of operation and the new and original arrangements and combinations of steps in the process hereinafter described and more particularly set forth in the claims.

In accordance with the present invention scrap storage battery plates or materials of similar composition together with a definite and predetermined amount of a suitable reducing fuel are charged to a reverberatory furnace and smelted at an appropriate and controlled temperature for the formation of three layers substantially as follows: a bottom layer of molten lead containing less than 2% antimony, an intermediate matte layer principally comprising lead sulphide and a top layer consisting mainly of a mixture of lead sulphide, lead oxide and antimony oxide.

At this stage, the lead sulphide in the two upper layers is broken down and sulphur eliminated as sulphur dioxide gas, lead is reduced to the metallic state and a concentration of antimony effected by adding a desulphurizing agent, preferably soda ash, in the presence of suitable reducing fuel to the furnace. This results in the formation of a top layer of sodium sulphate of discard grade, an intermediate layer of antimony-lead slag analyzing approximately 30% to 35% antimony and composed in main of lead oxide and antimony oxide with practically no sulphur and a lower layer of lead still containing 2% or less of antimony.

The two upper slags may then be removed from the furnace and the lower layer softened in situ for the production of lead containing, say, .05% or less of antimony. When the softening action has progressed to the desired point, the lead may be tapped from the furnace and the antimonial litharge resulting from the softening step allowed to remain in the furnace for the succeeding charge. In making the next charge the amount of fuel is calculated not only on the basis of the weight of battery plates charged but also on the amount of oxidized antimony and lead remaining in the furnace from the previous softening step.

In a specific case, 125 tons (wet weight) of battery plates were mixed with 1.6% of petroleum coke and charged to and smelted in a reverberatory furnace containing the antimony-litharge slag formed during the softening period of the preceding charge. The temperature of the furnace was maintained at approximately 1650° F. to 1750° F. during the charging and smelting period which required about 32 hours.

When the last of the charge was completely melted and had assumed a three layer composition comprising a top layer of mixed antimony oxide, lead oxide and lead sulphide analyzing approximately 15% antimony, an intermediate matte layer high in lead sulphide and a lower layer of lead containing some antimony, a mixture of 5000 pounds of soda ash and 830 pounds of petroleum coke was added within a period of three and one-half hours. Vigorous agitation of the bath and violent foaming accompanied the addition of the petroleum coke-sodium carbonate mixture.

The bath was allowed to settle for a one and one-half hour period after the last of the soda ash-coke had been charged, at which time three layers were present in the furnace as follows: a top slag of sodium sulphate containing only 0.4% lead and 1.5% antimony, an intermediate slag containing 31.5% antimony and 29.0% lead and a bottom layer of molten lead containing slightly less than 1.7% antimony. The sodium sulphate slag which weighed about two tons was then tapped and discarded following which the high antimony slag weighing 14 tons was tapped. The removal of these two slags was accomplished in about three hours.

Following the removal of the sodium sulphate and high antimony slags, water pipes were introduced for the first time and the lead softened by blowing with steam until the antimony content was reduced to approximately 0.04% which was accomplished in 16 hours. The softened lead amounting to 88 tons was then tapped from the furnace and the oxidized antimony-lead allowed to remain in the furnace for the succeeding charge.

It will thus be appreciated that the present invention provides an improved process for effectively smelting and softening scrap battery plates and materials of similar composition in a reverberatory furnace by totally eliminating the matte and materially increasing the concentration of antimony in the antimony slag while at the same time producing high grade lead. While the breaking down of the lead sulphide and the reduction of lead by the vigorous agitation and reaction of the soda ash and coke mixture with the slags is fairly complex, it is believed that the following equations are probably the more important ones involved:

$$7PbS + 4Na_2CO_3 \rightarrow Na_2SO_4 + 3Na_2S + 3PbS + 4Pb + 4CO_2$$
$$PbS + 2PbO \rightarrow 3Pb + SO_2$$
$$3Na_2S + 12PbO \rightarrow 12Pb + 3Na_2SO_4$$
$$2PbO + C \rightarrow 2Pb + CO_2$$

The amount of soda ash required is, of course, subject to variation within reasonable limits, but it has been determined that an amount equal to approximately 2% by weight of the scrap plates charged yields excellent results. Only a relatively small amount of reducing fuel need be used with the soda ash, some one-third of one percent of the weight of the plates charged usually being sufficient. The importance of the soda ash treatment is readily apparent when it is realized that an antimony slag concentration of only 20% to 25% can be effected using reducing fuel alone, while antimony concentrations of 30% to 35% are readily effected by the present process employing the soda ash-coke treatment.

In charging and smelting the scrap plates in accordance with the present invention care should be taken to avoid excessive temperatures. Preferably these operations are conducted at approximately 1650° F. or above and in no case should the temperature exceed 1850° F. Following the removal of the sodium sulphate and high antimony slags the bath should be allowed to cool while the molten lead is being softened and no fire at all is required unless the temperature of the bath falls below 1100° F.

While the use of petroleum coke has been specifically mentioned, it is understood that various other reducing fuels may be used. It is important, however, that the amount of reducing fuel used should be equivalent to the appropriate amount of petroleum coke. It has been determined that petroleum coke in amounts of approximately 1.6% of the scrap treated is sufficient for the material charged and the oxides of antimony and lead remaining in the furnace. However, as the amount of this latter material will vary somewhat according to the degree to which the lead is softened, allowance should be accordingly made, that is, when the lead is softened to, say, 0.025% antimony, for example, the amount of coke will be slightly more than if the softening action is halted when the lead has an antimony content of, say, .05%

From the foregoing description, numerous advantages of the invention are practically self-evident. The improved process provides not only for the production of softened lead, but also makes possible a much greater concentration of antimony than was heretofore effected by following ordinary reverberatory practice. Among other advantages, volatilization losses are greatly reduced.

While certain novel features of the invention have been disclosed and are pointed out in the annexed claims, it will be understood that various omissions, substitutions and changes may be made by those skilled in the art without departing from the spirit of the invention.

What is claimed is:

1. The process of treating scrap battery plates which comprises mixing said plates with approximately 1.6% of their weight of petroleum coke, charging same to a reverberatory furnace containing oxides of antimony and lead from the preceding charge, smelting same therein at a temperature of from 1650° F. to 1850° F., adding a mixture of soda ash and petroleum coke in the approximate respective quantities of two percent and one-third of one percent of the weight of the scrap treated thereby forming a top slag layer of sodium sulphate, an intermediate slag layer containing 30% to 35% antimony and a bottom layer of lead containing less than two percent antimony, removing the top and intermediate slags from the furnace, subjecting the lower remaining layer to oxidizing conditions sufficient to soften the lead and reduce its antimony content to below 0.05% and tapping the softened lead from the furnace.

2. The process of treating scrap battery plates which comprises mixing said plates with approximately 1.6% of their weight of petroleum coke, charging same to a reverberatory furnace containing oxides of antimony and lead from the preceding charge, smelting same therein at a temperature of from 1650° F. to 1850° F., adding a mixture of soda ash and petroleum coke in the approximate respective quantities of two percent and one-third of one percent of the weight of the scrap treated thereby forming a top slag layer of sodium sulphate, an intermediate slag layer containing 30% to 35% antimony and a bottom layer of lead containing less than two percent antimony, removing the top and intermediate slags from the furnace, subjecting the lower remaining layer to oxidizing conditions sufficient to soften the lead and reduce its antimony content to below 0.025%, tapping the softened lead from the furnace and charging further quantities of the scrap-coke mixture to the furnace containing the oxides remaining from the softening operation.

3. The method of operating a reverberatory furnace for the production of lead from scrap battery plates and materials of similar composition which comprises charging said plates together with a reducing fuel in quantity just sufficient to reduce the metal in the scrap and any oxides remaining in the furnace from the preceding charge into said furnace, smelting the charge at a temperature not exceeding 1850° F., adding approximately 2% of the original scrap weight of soda ash containing a lesser weight of carbonaceous fuel to said furnace thereby forming three layers comprising a top layer of sodium sulphate, an intermediate slag layer containing 30% to 35% antimony and a lower layer of lead containing less than 2% antimony, removing the two upper layers from the furnace and softening the lead in situ.

4. In the treatment of scrap battery plates and similar materials, the improved process which consists in smelting such material in a reverberatory furnace in the presence of a suitable reducing fuel and at a temperature not exceeding 1850° F. to produce three layers comprising a bottom layer of molten lead containing less than 2% antimony, an intermediate layer of matte and a top layer of antimony slag, thereafter breaking down the matte layer and concentrating antimony from the intermediate and top layers in a new intermediate layer by adding soda ash and a reducing fuel to the furnace and forming a new top layer of sodium sulphate, removing the newly formed top and intermediate layer from the furnace and softening the remaining layer of lead in situ.

5. The combined smelting and softening process for the treatment of scrap battery plates and the like which comprises charging such material together with approximately 1.6% of its weight of coke to a reverberatory furnace containing antimony litharge from a preceding charge, smelting same within a temperature range of 1600° F. to 1800° F., adding sodium carbonate in amounts approximating 2% by weight of the scrap material charged together with a smaller amount of a reducing fuel thereby breaking down the lead sulphide contained in the slag and matte formed during the smelting operation and concentrating antimony in a slag containing 30% to 35% of that element and softening the lead in situ.

6. In the reverberatory smelting of scrap battery plates or materials of similar composition by which such materials are directly reduced in the absence of flux, the improvement which comprises eliminating the losses ordinarily accompanying matte formation by treating said matte with a mixture of sodium carbonate and a solid reducing fuel.

7. In the reverberatory smelting of scrap battery plates and the like, the improved process which consists in smelting such material with appropriate quantities of a reducing fuel at a temperature of from 1600° F. to 1800° F., breaking down any matte formation by reacting same with soda ash in the presence of a reducing fuel thereby eliminating sulphur as a gas and concentrating antimony as a slag containing 30% to 35% of that element, removing the high antimony slag and any sodium sulphate slag from the furnace and softening the remaining lead by subjecting same to oxidation.

8. In the recovery of lead from scrap battery plates and the like, the process which comprises mixing same with a reducing fuel in quantity sufficient to reduce the scrap and litharge remaining from a previous softening operation, charging same to a reverberatory furnace containing the litharge from a preceding charge and smelting same at temperatures not exceeding 1850° F., adding to the smelted material a desulphurizing reagent together with a small quantity of a reducing fuel, removing the resulting slags from the furnace and softening the lead in situ.

9. The process for treating lead bearing material containing compounds of oxygen and sulphur which comprises charging same to a furnace of the reverberatory type containing oxides resulting from the softening step of a previous charge, smelting same at restricted temperatures in the presence of a reducing agent in quantity sufficient to reduce the oxide content of the total charge, adding a mixture of a fluxing agent and carbonaceous reducing fuel thereby breaking up matte formation and eliminating sulphur in gaseous form, effecting a separation between the molten lead and slags by removing the latter from the furnace and thereafter softening the lead in situ.

10. The process for treating antimonial lead materials such as scrap battery plates and the like which comprises smelting same in a reverberatory furnace with a restricted quantity of carbonaceous reducing material sufficient to reduce the oxide content of the charge including oxides remaining in the furnace from the preceding run thereby yielding a plurality of layers in the furnace, reacting the upper layers comprising principally sulphides and oxides with a mixture of flux and reducing fuel thereby concentrating the bulk of the antimony in a layer intermediate a bottom layer of lead containing only a minor percentage of antimony and a top slag layer of discard grade, removing the top and intermediate layers from the furnace, subjecting the lead to oxidizing condition to substantially eliminate antimony therefrom and tapping softened lead from the furnace.

11. In treating lead bearing materials having an appreciable sulphur content which is conducive to detrimental matte formation during smelting operations, the improvement which comprises smelting the material in a reverberatory furnace without flux at restricted temperatures and thereafter decomposing the matte and eliminating its sulphur content in a gaseous form by reaction with a flux in the presence of a reducing agent.

12. The process for treating scrap battery plates in a furnace of the reverberatory type which comprises smelting said plates at restricted temperatures in the presence of a predetermined amount of fuel sufficient to reduce the charge, adding thereto a flux and a suitable reducing agent thereby decomposing sulphides and eliminating sulphur in a gaseous form while simultaneously effecting a concentration of antimony, separating lead containing only a small percentage of antimony from the concentrated antimony slag and other constituents and thereafter softening said lead.

JESSE O. BETTERTON.